June 9, 1942.  F. B. TUTTLE  2,286,028
WELDING APPARATUS
Filed Jan. 30, 1942
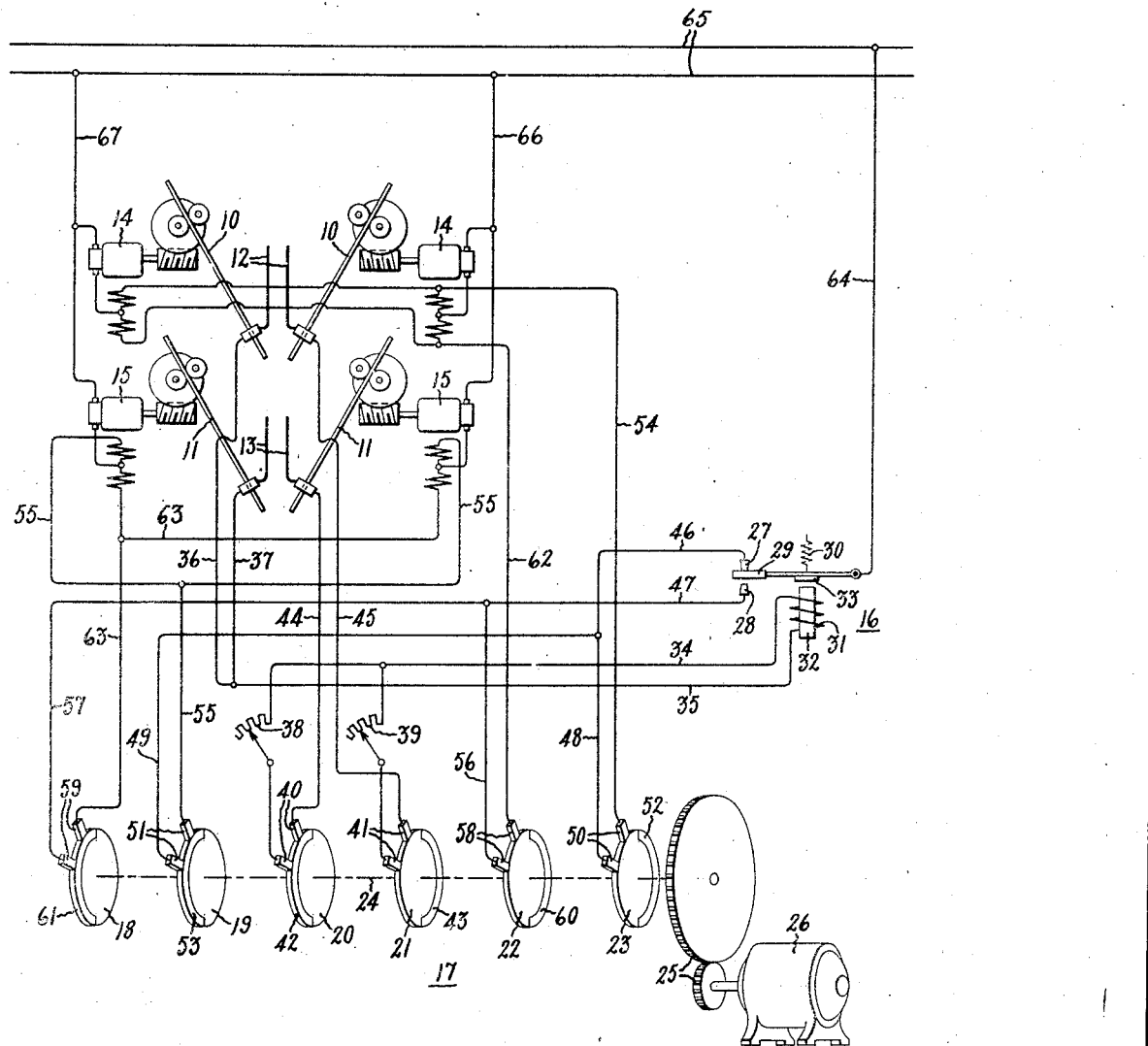
Inventor:
Frank B. Tuttle,
by Harry E. Dunham
His Attorney.

Patented June 9, 1942

2,286,028

UNITED STATES PATENT OFFICE 2,286,028

WELDING APPARATUS

Frank B. Tuttle, Schenectady, N. Y., assignor to General Electric Company, a corporation of New York Application January 30, 1942, Serial No. 428,886

6 Claims. (Cl. 219—8)

My invention relates to apparatus for automatically controlling a plurality of arcs. It is particularly suited for controlling a plurality of welding arcs which may or may not be associated with one another in a common unit or welding head.

When an arc is established between non-consuming electrodes, or electrodes that are consumed at a very slow rate in the presence of the arc, it is not necessary continuously to readjust the positions of the electrodes relative to one another in order to obtain a desired arcing condition, since an occasional readjustment of the electrodes is all that is required. In arc welding apparatus these conditions are frequency encountered. For example, in atomic hydrogen welding the arc is usually established between a pair of tungsten electrodes which are consumed in the hydrogen atmosphere at a very slow rate, and a plurality of closely spaced arcs are often employed in order to increase the welding speed of a head embodying a plurality of pairs of such refractory electrodes. My invention, however, is not limited to applications for controlling multiarc atomic hydrogen welding heads, since it is also applicable to other apparatus in which a plurality of arcs are employed singularly or as a group to perform a desired operation or operations. It may also be applied to the control of a plurality of arcs established between one or more electrodes that are consumed in the presence of an arc at a fairly rapid rate.

It is an object of my invention to provide control apparatus in which a single regulating means is employed for automatically controlling a plurality of arcs.

It is a further object of my invention to provide a simplified control for positioning pairs of cooperating electrodes relatively to one another in each of a plurality of welding circuits in response to a characteristic determined by the arc established between said cooperating electrodes in each of said welding circuits.

It is also an object of my invention to provide a single regulating means which is connected in a desired sequence for predetermined intervals of time to control each of a plurality of pairs of electrodes and the arc established therebetween independently of the control exerted on others thereof by said regulating means.

Further objects of my invention will become apparent from a consideration of the simplified control diagrammatically represented in the accompanying drawing.

In accordance with the illustrated embodiment of my invention a single regulating means is employed for periodically controlling each of a plurality of welding arcs established between pairs of cooperating electrodes. This regulating means is periodically connected to be responsive to an arc condition in each welding circuit and to control each of the welding heads employed for feeding the electrodes in said circuit relative to one another. The regulating means is provided with a control circuit which is common to each of the motor means of the welding heads for the pairs of electrodes and with an energizing or responsive circuit which is common to each of the welding arcs or the welding circuits in which said arcs are connected. A plurality of branch circuits from the energizing and control circuits of the regulating means are completed by a distributor means for predetermined intervals of time in a predetermined sequence to each of the welding circuits and the motor means of the welding heads corresponding thereto. Means are also provided for independently adjusting the response of the regulating means to one or more of the welding arcs or the circuits in which said arcs are connected.

In the simplified arrangement illustrated in the drawing cooperating pairs of electrodes 10 and 11 are connected in independent welding circuits 12 and 13. These pairs of electrodes are fed toward and away from one another by electrically operated motor means 14 and 15. The motor means for each pair of electrodes forms part of a mechanism usually identified as a welding head, and in the present instance comprises two independent electric motors each of which is gear connected to feed rolls which engage each one of a pair of cooperating electrodes. Each pair of motors for each welding head is simultaneously controlled for feeding the electrodes toward and away from one another. Each of these motors is provided with two field windings, the arrangement being such that when a motor is energized through one field winding it rotates in one direction, and when energized through the other field winding it rotates in the opposite direction.

The operation of the motor means of each welding head for each pair of electrodes is controlled by a single regulator 16. This regulator is provided with a control circuit common to the motor means of each welding head and an energizing or sensitive circuit which is common to each of the welding circuits for these pairs of electrodes. A distributor 17 is employed for periodically connecting the control and energizing circuits of the regulator to each of the motor means of the welding heads and the welding circuits for the pairs of electrodes controlled by these welding heads. In the arrangement illustrated the distributor comprises six disks 18 to 23 mounted on a common shaft 24 which is connected through gearing 25 to a motor 26 which may be an adjustable speed electric motor or its equivalent.

The regulator 16 shown in the drawing is a contact making volt meter having a pair of fixed contacts 27 and 28 and a movable contact 29 which is biased to engage fixed contact 27 by means of a spring 30. The energizing or sensitive coil 31 of this regulator controls the magnetization of a core 32 which in turn controls the position of an armature 33 carrying the movable contact 29 of the regulator.

The energizing or sensitive coil of the regulator 16 is provided with energizing connections 34 and 35. Connection 35 branches into conductors 36 and 37 to one of each of the pairs of electrodes 10 and 11, and connection 34 branches into connections including adjustable resistors 38 and 39, brushes 40 and 41, conductive segments 42 and 43 of disks 20 and 21 and conductors 44 and 45 to the other of each of the pairs of electrodes 10 and 11. The adjustable resistors 38 and 39 make it possible to control independently the response of the regulator means to arcing conditions in the welding circuits of electrodes 10 and 11.

Control connections 46 and 47 of regulator 16 are common to each of the motor means of the welding heads for pairs of electrodes 10 and 11. Connection 46 branches through conductors 48 and 49, brushes 50 and 51, segments 52 and 53 of disks 23 and 19 and conductors 54 and 55 to corresponding field connections of motor means 14 and 15 of the welding heads for pairs of electrodes 10 and 11. Connection 47 branches through conductors 56 and 57, brushes 58 and 59 and segments 60 and 61 of disks 22 and 18, and conductors 62 and 63 to the other corresponding field connections of motor means 14 and 15. Control connections 46 and 47 of regulator 16 are respectively connected to its fixed contacts 27 and 28. The movable contact 29 of the regulator is connected through another control connection 64 to one side of the source of supply 65. The other side of this source of supply is connected through conductors 66 and 67 to the armatures of motor means 14 and 15 of the welding heads for pairs of electrodes 10 and 11.

Disks 18 to 23 of the distributor 17 may be made of an electrical insulating material, or have insulating segments extending along their peripheries from one end to the other of the conductive segments 61, 53, 42, 43, 60 and 52 of these disks so that when brushes 59, 51, 40, 41, 58 and 50 leave these conductive segments, the circuits through these brushes are interrupted. The conductive segments 61, 53 and 42 of distributor disks 18, 19 and 20 are 180° in length and displaced 180° from the segments 43, 60 and 52 of distributor disks 21, 22 and 23. Consequently, when circuits are completed through brushes 59, 51 and 40 by segments 61, 53, and 42 of disks 18, 19 and 20, circuits through brushes 41, 58, and 50 are interrupted by being out of engagement with segments 43, 60 and 52 of disks 21, 22 and 23. As previously stated these circuits are made and interrupted periodically by the rotation of disks 18 to 23 through the agency of motor 26 gear connected therewith. Consequently, the distributor 17 periodically connects the single regulator 16 to each of the welding heads and welding circuits associated therewith in a predetermined sequence for predetermined intervals of time.

With the distributor disks in the positions illustrated in the drawing, the energizing or sensitive coil 31 of regulator 16 is connected across the pair of electrodes 11 through brushes 40 and segment 42 of disk 20. At the same time control connection 46 of regulator 16 is connected through brushes 51 and segment 53 of disk 19 to the upper field windings of motor means 15 for the welding head which controls the feeding of electrodes 11 and control connection 47 of regulator 16 is connected through brushes 59 and segment 61 of disk 18 to the lower field windings of motor means 15. The regulator is thus connected to be responsive to the voltage across electrodes 11 or the arc established therebetween. When this voltage exceeds a predetermined value, the energizing or sensitive coil 31 of the regulator closes its contacts 28 and 29 against the bias of spring 30 to complete a control circuit through the lower field windings of motor means 15 across the source of supply 65. This will cause the motor means to operate to feed the electrodes toward one another and thus decrease the separation of their arcing terminals and the length of the arc and its voltage. Conversely, if the voltage between electrodes 11 is less than a predetermined value, a control circuit through contacts 27 and 29 of regulator 16 will connect motor means 15 through their upper field windings across the source of supply 65 and cause them to rotate in the opposite directions to separate electrodes 11 until the desired arc length and voltage is obtained.

While the regulator is thus employed for controlling the adjustment of electrodes 11 and the arc established therebetween, motor means 14 for the welding head employed for feeding the pair of electrodes 10 is deenergized by the open circuits at brushes 50 and 58 of the distributor 17. Furthermore, the branch of the energizing circuit from electrodes 10 to coil 31 of regulator 16 is interrupted at brushes 41 of the distributor.

As the disks of the distributor rotate the circuits completed through brushes 59, 51 and 40 are interrupted and the circuits through brushes 41, 58 and 50 are completed, thus transferring the regulator from its control of the pair of electrodes 11 to the control of the pair of electrodes 10. The control of the pair of electrodes 10 by the regulator is the same as that above described in connection with the control of the pair of electrodes 11. Thus, as the disks of the distributor rotate, the regulator is effective, first to control the pair of electrodes 11 and then the pair of electrodes 10.

In the arrangement illustrated the intervals of time during which the regulator is effective for controlling the pairs of electrodes 10 and 11 is the same, since the lengths of the segments on the control disks of the regulator are the same. It is, of course, apparent that by choosing segments of different lengths, or by controlling the speed of motor 26, or by varying both of these factors, the regulator may be used for controlling one pair of electrodes for a different interval of time than it is used for controlling the other pair of electrodes. Such differences in times of application of the regulator to the control of each pair of electrodes may be desirable because of conditions peculiar to each pair of electrodes or the welding circuits in which they are connected. For example, the power supplied to one arc may be greater than that supplied to others and the consequent greater electrode consumption may require more frequent and longer adjustment periods to obtain the control required.

The adjustable resistors 38 and 39 make it possible to adjust independently the response of regulator 16 to the arcing conditions of each of the pairs of electrodes 10 and 11. It is thus possible to adjust the regulator for holding one voltage between the pair of electrodes 10 and a different voltage between the pair of electrodes 11.

It is, of course, apparent that the simple contact making volt meter type of regulator illustrated in the drawing may be replaced by other forms of regulators responsive to voltage, current, energy or other condition of an arc or its circuit. For example, the electronic control and regulator shown in United States Letters Patent 2,175,017 of William D. Cockrell granted October 3, 1939, and assigned to the assignee of this invention may be employed. Furthermore, instead of employing a welding head wherein each of a pair of electrodes is individually controlled by its own motor means, a single motor means may be employed for controlling both of the electrodes of a pair through the agency of a mechanism such as shown in Fig. 7 of United States Letters Patent 1,946,305 of James T. Catlett granted February 6, 1934, and assigned to the assignee of this invention. Furthermore, a single motor may be employed for controlling the feeding of all the pairs of electrodes through the agency of a plurality of electromagnetically operated clutches such as shown in United States Letters Patent 1,701,372 of Frank F. Jefts granted February 5, 1929, and assigned to the assignee of this invention.

The motor means of the welding heads need not be electrical or mechanical means electrically controlled, since mechanical means mechanically controlled may be employed by using a mechanical distributor for transferring a mechanical control connection of the regulator.

Furthermore, my invention may be applied to the control of arcs established between one or more consuming electrodes, such as are used in that form of welding known as metallic arc welding. In such case the motor means of each welding head may be set to feed one or both of the electrodes at a rate commensurate with average electrode consumption in the arc, and a single regulator through the agency of a distributor would periodically correct the speed of the motor means for any pair of cooperating electrodes in accordance with variations of the arc resulting from differences in the feeding rate and consumption rate of one or more of the electrodes. Other arrangements will occur to those skilled in this art.

It is also apparent that many modifications may be made in the construction of the distributor. For example, the six disks illustrated in the drawing may be replaced by a single disk about whose periphery the conductive segments and brushes of the disks 18 to 23 are properly distributed. Furthermore, the conductive segments and brushes may be replaced by switches operated by cam portions on one or more disks associated therewith. The speed of the distributor motor 26 may be suitably controlled, or the transmission between the motor and the switching mechanism of the distributor may be suitably controlled, to accomplish any desired speed of operation which will determine the duration of the intervals during which the regulator is effective for controlling each pair of electrodes and the arc established therebetween.

Although only two pairs of electrodes have been illustrated in the drawing it is, of course, apparent that more than two pairs may be employed. For example, the control of this invention is admirably suitable for controlling the pairs of electrodes of a multiarc welding head such as disclosed in United States Letters Patent 2,282,031 of James T. Catlett for Welding apparatus, granted May 5, 1942, and assigned to the assignee of this invention.

As previously stated, my invention is not limited to the control of a plurality of welding arcs, since it may be employed for controlling a plurality of arcs used for any purpose. Also as was pointed out above, it is not necessary that the pairs of electrodes be associated with one another in the same piece of apparatus. It is possible to use the control of my invention for independent welding heads acting on different work parts.

Modifications of my invention will occur to those skilled in the art in view of the above description thereof. I aim, therefore, in the appended claims to cover all such modifications as fall within the true spirit and scope of my invention.

What I claim as new and desire to secure by Letters Patent of the United States is:

1. Apparatus comprising a plurality of circuits in each of which is connected a pair of cooperating electrodes whose position relative to one another determines an electrical characteristic of its said circuit, a plurality of electrode feeding means each of which controls the relative position of one of said pairs of cooperating electrodes, regulating means responsive to departures from a desired electrical characteristic of any one of said circuits for operating said electrode feeding means associated therewith to re-establish said desired characteristic by the proper positioning of said pair of cooperating electrodes connected in said one of said circuits, and distributor means for connecting said regulating means to each of said circuits and said electrode feeding means associated therewith in a desired sequence for predetermined intervals of time.

2. Apparatus comprising a plurality of circuits in each of which is connected a pair of cooperating electrodes whose position relative to one another determines an electrical characteristic of its said circuit, a plurality of electrode feeding means each of which controls the relative position of one of said pairs of cooperating electrodes, regulating means responsive to departures from a desired electrical characteristic of any one of said circuits for operating said electrode feeding means associated therewith to re-establish said desired characteristic by the proper positioning of said pair of cooperating electrodes connected in said one of said circuits, distributor means for connecting said regulating means to each of said circuits and said electrode feeding means associated therewith in a desired sequence for predetermined intervals of time, and means for independently adjusting the response of said regulating means to said electrical characteristic of one or more of said circuits.

3. Welding apparatus comprising a plurality of welding circuits in each of which is connected a pair of cooperating electrodes whose position relative to one another determines an electrical characteristic of its said welding circuit, a plurality of motor means each of which controls the feeding of one of said pairs of cooperating electrodes relative to one another, regulating means responsive to departures from a predetermined desired characteristic of any one of said welding circuits for operating said motor means associated therewith to re-establish said desired characteristic by properly positioning said cooperating electrodes connected in said one of said circuits, said regulating means having a control connection common to each of said motor means and an energizing connection common to each of said welding circuits, and distributor means for respectively connecting said energizing and said control connections of said regulating means to each one of said welding circuits and said motor means associated therewith in a desired sequence for predetermined intervals of time.

4. Welding apparatus comprising a plurality of welding circuits in each of which is connected a pair of cooperating electrodes whose position relative to one another determines an electrical characteristic of its said welding circuit, a plurality of welding heads each of which is provided with electrically operated motor means for controlling the relative positions of one of said pairs of cooperating electrodes, regulating means responsive to departures from a predetermined desired characteristic of any one of said welding circuits for operating said motor means of said welding head associated therewith to re-establish said desired characteristic by the proper positioning of said cooperating electrodes relative to one another in said one of said welding circuits, said regulating means having a control circuit common to each of said motor means of said welding heads and an energizing circuit common to each of said welding circuits, a plurality of branch circuits from said control circuit and said energizing circuit of said regulating means to each of said welding head motor means and said welding circuit associated therewith, and means for simultaneously connecting for predetermined time intervals in a predetermined sequence said control and energizing circuits of said regulating means to said branch circuits for each of said welding head motor means and said welding circuit associated therewith.

5. Welding apparatus comprising a plurality of welding circuits in each of which is connected a pair of cooperating electrodes whose position relative to one another determines an electrical characteristic of its said welding circuit, a plurality of electrically controlled motor means each of which controls the feeding of a pair of said cooperating electrodes relative to one another, regulating means responsive to departures from a predetermined desired characteristic of any one of said welding circuits for operating said motor means associated therewith to re-establish said desired characteristic by the proper positioning of said cooperating electrodes connected in said one of said welding circuits, said regulating means having a control circuit common to each of said motor means and an energizing circuit common to each of said welding circuits, distributor means for respectively connecting said control and energizing circuits of said regulating means to each of said motor means and the welding circuit associated therewith in a desired sequence for predetermined intervals of time, and means for independently controlling the response of the energizing circuit of said regulating means to said electrical characteristic of one or more of said welding circuits.

6. Welding apparatus comprising a plurality of welding circuits in each of which is connected a pair of cooperating electrodes whose position relative to one another determines an electrical characteristic of its said welding circuit, a plurality of electric motor means each of which controls the feeding of a pair of said cooperating electrodes relative to one another, regulating means responsive to departures from a predetermined desired voltage characteristic of any one of said welding circuits for operating said electric motor means for said cooperating electrodes in said one of said welding circuits to re-establish said desired voltage characteristic by the proper positioning of said electrodes, said regulating means having an energizing circuit responsive to voltage variations and control circuits selectively energized in accordance with variations above or below a predetermined value of voltage applied to said energizing circuit, a plurality of circuits branching to each of said pairs of electrodes of said welding circuits from said energizing circuit of said regulating means, a plurality of circuits branching to each of said electric motor means from said control circuits of said regulating means, and means for completing for predetermined time intervals in a predetermined sequence the branch circuits from said energizing and control circuits of said regulating means to each of said welding circuits and its corresponding motor means.

FRANK B. TUTTLE.